(12) United States Patent
Fazzalari et al.

(10) Patent No.: US 9,180,845 B2
(45) Date of Patent: Nov. 10, 2015

(54) PASSENGER CAR TRANSPORT

(75) Inventors: Francesco Fazzalari, Oxford, MI (US); Udo Ronnenberg, Wedemark (DE); Ulrich Weihe, Garbsen (DE); Jonathan LaFalce, Holly, MI (US)

(73) Assignee: WABCO GmbH, Hannover (DE)

( * ) Notice: Subject to any disclaimer, the term of this patent is extended or adjusted under 35 U.S.C. 154(b) by 598 days.

(21) Appl. No.: 13/040,991

(22) Filed: Mar. 4, 2011

(65) Prior Publication Data

US 2012/0223827 A1 Sep. 6, 2012

(51) Int. Cl.
*G08B 21/00* (2006.01)
*B60T 7/16* (2006.01)
*B60P 3/08* (2006.01)

(52) U.S. Cl.
CPC .... *B60T 7/16* (2013.01); *B60P 3/08* (2013.01)

(58) Field of Classification Search
CPC .................................... B60P 3/08; B60T 7/16
USPC .................. 340/425.5, 431, 438, 441; 296/61
See application file for complete search history.

(56) References Cited

U.S. PATENT DOCUMENTS

| | | | | |
|---|---|---|---|---|
| 4,988,974 | A * | 1/1991 | Fury et al. | 340/431 |
| 5,907,276 | A * | 5/1999 | Lance | 340/425.5 |
| 6,006,144 | A * | 12/1999 | Takahashi et al. | 701/1 |
| 6,225,894 | B1 * | 5/2001 | Kyrtsos | 340/440 |
| 8,179,238 | B2 * | 5/2012 | Roberts et al. | 340/431 |
| 2006/0186636 | A1 * | 8/2006 | Schutt et al. | 280/477 |
| 2008/0042865 | A1 * | 2/2008 | Shephard et al. | 340/686.6 |
| 2008/0278299 | A1 * | 11/2008 | Beverly et al. | 340/431 |
| 2010/0042281 | A1 * | 2/2010 | Filla | 701/22 |

* cited by examiner

*Primary Examiner* — Mark Rushing
(74) *Attorney, Agent, or Firm* — Kramer Levin Naftalis & Frankel LLP

(57) ABSTRACT

A vehicle for transporting passenger cars has an adjustable loading ramp for loading and unloading passenger cars. The loading ramp can be placed in at least two positions. One position is a travel position and is to be set when the passenger car transport is traveling. The passenger car transport also has an electronic monitoring system that includes at least one monitoring sensor operable to sense whether the loading ramp is in the travel position. The electronic monitoring system employs monitoring electronics configured to evaluate the signals of the monitoring sensor and to transmit to a display device corresponding information indicating whether or not the loading ramp is in the travel position.

14 Claims, 1 Drawing Sheet

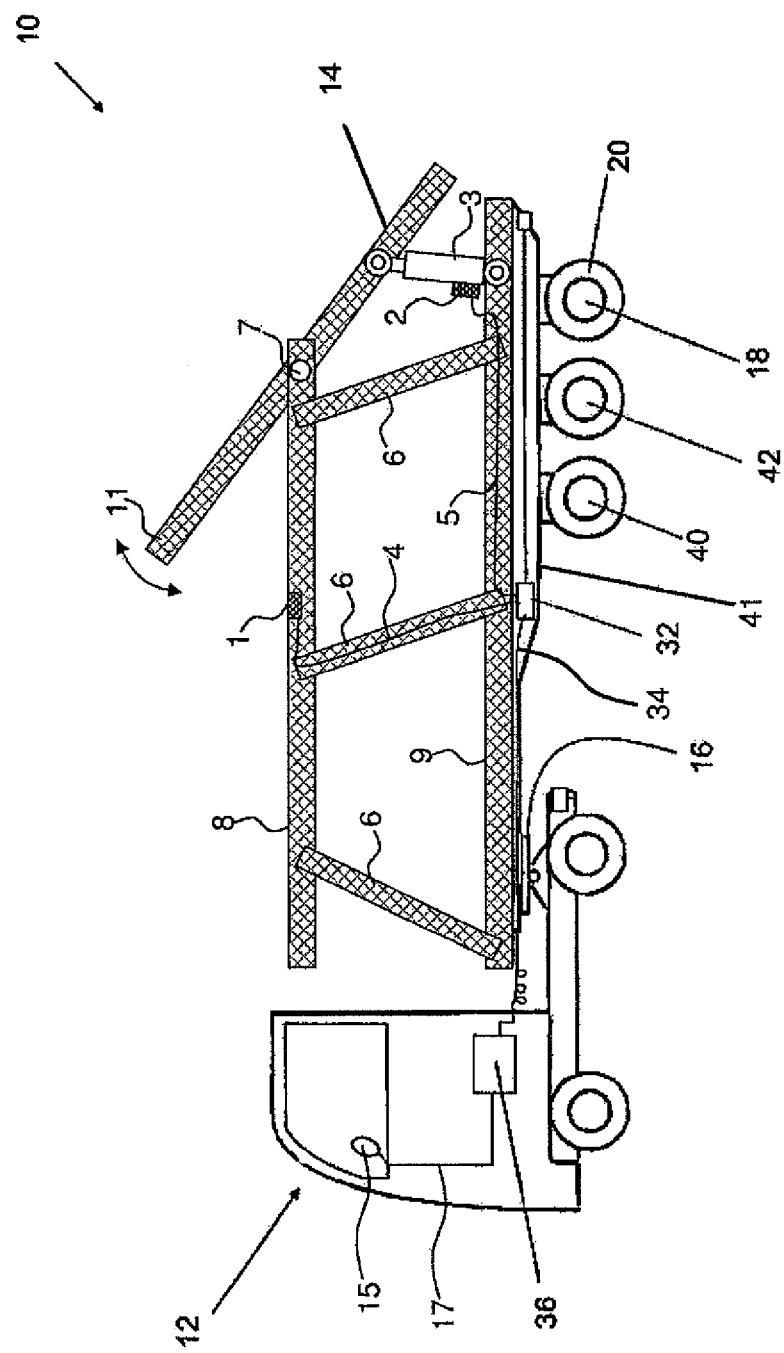

PASSENGER CAR TRANSPORT

FIELD OF THE INVENTION

The present invention generally relates to embodiments of a transport vehicle for transporting passenger cars.

BACKGROUND OF THE INVENTION

Passenger car transport vehicles of the general type under consideration typically have two loading levels for passenger cars—one level located on top of the other. In order to load the upper loading level, a pivotable loading ramp is attached thereto, which can, for example, be pivoted hydraulically. As a result, the loading ramp can be adjusted in at least two positions. For the loading or unloading process, the loading ramp is placed in a first, raised position in which the loading ramp is positioned obliquely such that passenger cars can be driven from the roadway onto the loading ramp (loading) or can be driven from the loading ramp onto the roadway (unloading). In the course of loading or unloading, or thereafter, the loading ramp can be placed in a second, horizontal position in which it is essentially aligned with the upper loading level. The horizontal position is intended in particular also to be assumed in the driving state of the passenger car transport.

When the loading ramp is positioned obliquely, which is also referred to herein as the raised position, part of the loading ramp protrudes upward to a considerable extent over the passenger car transport, with the result that it is not always possible to drive under bridges or overpasses. For this reason, before starting a trip, the driver of the passenger car transport will place the loading ramp in the horizontal position. However, this is unfortunately sometimes forgotten, which can present a hazardous driving situation that can lead to damage being inflicted on the passenger car transport, its cargo and on bridges or overpasses.

SUMMARY OF THE INVENTION

Generally speaking, it is an object of the present invention to provide a passenger car transport that is safe with respect to the problematic situation described above.

It will be appreciated that, advantageously, the inventive embodiments enable errors and damage occurring due to incorrect human behavior to be avoided by an automatically operating electronic monitoring system employing monitoring electronics. By providing the driver of the passenger car transport with corresponding information about the state of the loading ramp by means of a display device it is possible to give the driver prompt warning if the loading ramp is not in a position that is suitable for driving.

According to one embodiment of the present invention, the monitoring electronics are integrated into ABS (anti-lock braking system) electronics or an electronic driving stability system. An electronic driving stability system is understood here to be, in particular, an ESP (Electronic Stability Program) system and a system for preventing or reducing the risk of a vehicle tipping over about its longitudinal axis.

According to another embodiment of the present invention, the monitoring system is configured to automatically activate the brakes of the passenger car transport if the monitoring electronics detect that the loading ramp is not in the travel position.

In yet another embodiment of the present invention, the monitoring electronics are configured to transmit to the display device the information indicating whether the loading ramp is in the travel position or not in the travel position in accordance with the SAE J2497 protocol.

According to a further embodiment, the monitoring electronics are configured to generate a warning message for warning the driver of the passenger car transport if the monitoring electronics detect that the loading ramp is not in the travel position.

According to a still further embodiment of the present invention, the monitoring electronics are configured to generate the warning message only when the monitoring electronics detect that the passenger car transport is in the driving state.

In another embodiment, the loading ramp has at least one raised position and one non-raised position.

According to still another embodiment, the monitoring sensor is configured to sense the position of at least one hydraulic actuator element that is configured to adjust the loading ramp. The monitoring sensor can be embodied, for example, as a mechanical switch that senses a mechanical position of the hydraulic actuator element, or as a pressure sensor or pressure switch that senses the hydraulic pressure of the hydraulic actuator element.

According to a further embodiment of the present invention, a plurality of monitoring sensors is provided.

Still other objects and advantages of the present invention will in part be obvious and will in part be apparent from the specification.

The present invention accordingly comprises the features of construction, combination of elements, and arrangement of parts that will be exemplified in the constructions hereinafter set forth, and the scope of the invention will be indicated in the claims.

BRIEF DESCRIPTION OF THE DRAWINGS

For a fuller understanding of the inventive embodiments, reference is had to the following description taken in connection with the accompanying drawing in which:

FIG. 1 is a side view of a passenger car transport in accordance with an embodiment of the present invention.

DETAILED DESCRIPTION OF THE PREFERRED EMBODIMENTS

Referring now to FIG. 1, the passenger car transport includes a tractor vehicle 12 and a trailer vehicle 10. The trailer vehicle is connected via a coupling 16 to the tractor vehicle 12. The trailer vehicle 10 is embodied as a semitrailer. The trailer vehicle has three axles 18, 40, 42 that are provided with respective wheels 20. The axles 18, 40, 42 are arranged on an underbody 41 of the trailer vehicle 10. On the underbody 41, the vehicle body has a lower loading level 9 and an upper loading level 8 arranged thereabove. The upper loading level 8 is held by supports 6. The upper loading level 8 and the lower loading level 9 are designed to be loaded with passenger cars.

A loading ramp 14, which can pivot about a joint 7, is disposed on the upper loading level 8. The loading ramp 14 can be adjusted by a hydraulic actuator element 3, for example a hydraulic cylinder. The hydraulic actuator element 3 is attached, at one end, to the lower loading level 9 and, at the other end, to the loading ramp 14. In the retracted position of the hydraulic actuator element 3, which is illustrated in FIG. 1, the loading ramp 14 is in an oblique position, raised position because an upper region 11 of the loading ramp projects relatively far above the trailer vehicle 10. It should be appreciated that the passenger car transport should not be driven in this position of the loading ramp 14. The position serves instead to load or unload passenger cars, with a further lower ramp being additionally provided for extending the length of the loading ramp 14, which lower loading ramp can be moved out of the lower loading level 9.

When the hydraulic actuator element 3 is extended, the loading ramp 14 is positioned in an approximately horizontal position in which it is at least in approximately the same position as the upper loading level 8. In this position, the loading ramp 14 is in the travel position, so that it is suitable to drive the passenger car transport.

FIG. 1 also shows a first monitoring sensor 1 disposed on the upper loading level 8. The first monitoring sensor 1 outputs a signal if the loading ramp 14 is in the horizontal position, i.e. in the travel position. Sensor 1 can be embodied, for example, as an inductive proximity switch. Sensor 1 is connected via a cable 4 to monitoring electronics 32.

In addition, a second monitoring sensor 2 is provided on the hydraulic actuator element 3. The second monitoring sensor 2 monitors the hydraulic pressure in the hydraulic actuator element 3. Sensor 2 outputs a signal that indicates that the hydraulic pressure in the hydraulic actuator element 3 exceeds a specific value characteristic of an extended state of the hydraulic actuator element 3. The second monitoring sensor 3 can be embodied, for example, as a hydraulic pressure switch. Sensor 2 is connected via a cable 5 to the monitoring electronics 32.

Advantageously, additional monitoring sensors can be employed. The monitoring sensors can be embodied, in particular, as monitoring switches, which permits a cost-effective implementation. The use of a plurality of monitoring sensors permits more precise monitoring of a multiplicity of activation elements and actuator elements that are involved in the adjustment of the loading ramp. As a result, a finer differentiation can be implemented between positions of the loading ramp or of the actuator elements that are permissible for the driving state of the passenger car transport.

The monitoring electronics 32 can be embodied as independent separate electronics in the form of an electronic control unit in the passenger car transport including a programmable processor suitably programmed (according to known techniques) to carry out its functionality in accordance with the embodiments of the present invention. In a preferred embodiment, the monitoring electronics 32 can be, for example, part of ABS electronics or part of an electronic driving stability system.

The use of ABS electronics or an electronic driving stability system for the monitoring system has the advantage that the monitoring system can be implemented cost-effectively since there is no need for separate monitoring electronics in the form of separate hardware. Instead, electronic hardware components and software functions of ABS electronics or of a similar electronic control unit can be used for the monitoring function of the monitoring system. The use of ABS electronics or an electronic driving stability system for the monitoring system has the additional advantage that further vehicle operating signals such as, for example, the velocity or the air pressure in a pneumatic suspension system can be used as further input signals for a corresponding automatic function. In particular, the function of the monitoring electronics can be implemented by a programmable function unit of the ABS electronics or of the electronic driving stability system.

The transmission of information indicating whether the loading ramp is in the travel position or not in the travel position from the monitoring electronics to the display device can take place, for example, in a wire-bound fashion via a cable, via a bus system, which is already present in the passenger car transport, or in a wireless fashion via a radio link. Preferably, the monitoring electronics are configured (by means of appropriate programming using known programming techniques) to transmit to the display device the information indicating whether the loading ramp is in the travel position or not in the travel position in accordance with the SAE J2497 protocol. As a result, communication pathways already present in the passenger car transport are used, which has the advantage that no additional communication channel, for example in the form of separate cabling, is necessary. The transmission of information to the display device can take place, in particular, via existing power supply lines of the trailer vehicle, which are connected to the tractor vehicle of the passenger car transport, for example in the manner of power line communication.

The embodiment of the present invention depicted in FIG. 1 shows the monitoring electronics 32 connected via a line 34 to control electronics 36 of the tractor vehicle 12. The control electronics 36 are connected via a cable 17 to a display device 15 in the tractor vehicle 12, ideally within the driver's field of vision. The control electronics 36 can also be integrated into the display device 15 or can be part of the display device.

The monitoring electronics 32 evaluate the signals of the first monitoring sensor 1 and of the second monitoring sensor 2. If by means of these signals it is possible to unambiguously determine that the loading ramp 14 is in the travel position, the monitoring electronics 32 transmit a corresponding information item via the cable 34 to the control electronics 36, which displays a corresponding visual information item on the display device 15. If the monitoring electronics detect a different position of the loading ramp 14 than the travel position, the corresponding information item indicating that the loading ramp 14 is not in the travel position is transmitted via the cable 34 to the control electronics 36. The control electronics 36 display a corresponding visual information item on the display device 15.

The monitoring electronics 32 are also connected to at least one speed sensor, for example a wheel speed sensor, such as is used in an ABS system. As a result, the monitoring electronics 32 sense the velocity of the passenger car transport. When a corresponding velocity indicative of a driving state of the passenger car transport is detected, and if the loading ramp 14 is not in the travel position, the monitoring electronics 32 generate a warning message to increase the attentiveness of the driver with respect to states that are not suitable for driving. This has the advantage that the warning message is generated only in critical situations, i.e. not when the vehicle is stationary. As a result it is possible to prevent the attentiveness of the driver with respect to the warning message being reduced by unnecessary generation of the warning message.

The warning message can be displayed, for example, via the display device 15, e.g., with a warning color, for example a red warning symbol. An acoustic signal can also be generated as a warning message.

In addition, the monitoring electronics 32 can generate an activation signal for the brakes of the trailer vehicle 10 and, if appropriate, of the tractor vehicle 12, if it is detected that the loading ramp 14 is not in the travel position. In this context, in particular, the brakes of a trailer of the passenger car transport can be activated automatically. This further increases safety since the driver is not only warned by the monitoring system by means of the display device, but, in addition, there is active intervention in an operating function of the passenger car transport by virtue of the fact that the brakes thereof are activated. The activation of the brakes can be already initiated when the passenger car transport is stationary, or it may not be initiated until the passenger car transport is traveling.

It will thus be seen that the objects set forth above, among those made apparent from the preceding description, are efficiently attained, and since certain changes may be made in the above constructions without departing from the spirit and scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A passenger car transport, comprising:
    an adjustable loading ramp for loading and unloading passenger cars, the loading ramp being positionable in at least a travel position for when the passenger car transport is traveling;
    a display device;
    an electronic monitoring system including at least one monitoring sensor operable to sense whether the loading ramp is in the travel position, at least one of the at least one monitoring sensor being an inductive proximity switch sensor disposed on an upper loading level of at least two loading levels of the passenger car transport, the electronic monitoring system further including monitoring electronics operable to evaluate signals transmitted by the at least one monitoring sensor and to transmit to the display device a corresponding information item indicative of whether the loading ramp is in the travel position or not in the travel position, wherein the monitoring system is operable to automatically brake the passenger car transport when the monitoring electronics detect that the loading ramp is not in the travel position; and
    at least one wheel speed sensor connected to the electronic monitoring system to sense a velocity of the passenger car transport, wherein the monitoring electronics are adapted to generate a warning when the velocity is indicative of a driving state.

2. The passenger car transport as claimed in claim 1, wherein the monitoring system is operable to automatically brake a trailer of the passenger car transport.

3. The passenger car transport as claimed in claim 1, wherein the monitoring electronics are adapted to transmit to the display device the information item indicative of whether the loading ramp is in the travel position or not in the travel position in accordance with SAE J2497 protocol.

4. The passenger car transport as claimed in claim 1, wherein the monitoring electronics are adapted to generate a warning when the monitoring electronics detect that the loading ramp is not in the travel position.

5. The passenger car transport as claimed in claim 1, wherein the loading ramp is positionable in a raised and a non-raised position, the non-raised position corresponding to the travel position.

6. The passenger car transport as claimed in claim 1, wherein at least one of the monitoring sensors is operable to sense the position of at least one hydraulic actuator element that adjusts the loading ramp.

7. The passenger car transport as claimed in claim 1, wherein at least one of the monitoring sensors is a monitoring switch.

8. The passenger car transport as claimed in claim 6, the monitoring sensors comprising a hydraulic sensor operable to sense the position of the at least one hydraulic actuator element.

9. A passenger car transport, comprising:
    an adjustable loading ramp for loading and unloading passenger cars, the loading ramp being positionable in at least a travel position for when the passenger car transport is traveling;
    a display device; and
    an electronic monitoring system including at least one monitoring sensor operable to sense whether the loading ramp is in the travel position, the at least one monitoring sensor comprising a hydraulic sensor operable to sense the position of at least one hydraulic actuator element that adjusts the loading ramp and an inductive proximity switch sensor disposed on an upper loading level of at least two loading levels of the passenger car transport, the electronic monitoring system further including monitoring electronics operable to evaluate signals transmitted by the at least one monitoring sensor and to transmit to the display device a corresponding information item indicative of whether the loading ramp is in the travel position or not in the travel position, wherein the monitoring system is operable to automatically brake the passenger car transport when the monitoring electronics detect that the loading ramp is not in the travel position.

10. The passenger car transport as claimed in claim 9, wherein the monitoring electronics are adapted to transmit to the display device the information item indicative of whether the loading ramp is in the travel position or not in the travel position in accordance with SAE J2497 protocol.

11. The passenger car transport as claimed in claim 9, wherein the monitoring electronics are adapted to generate a warning when the monitoring electronics detect that the loading ramp is not in the travel position.

12. The passenger car transport as claimed in claim 9, wherein the loading ramp is positionable in a raised and a non-raised position, the non-raised position corresponding to the travel position.

13. The passenger car transport as claimed in claim 9 wherein at least one of the monitoring sensors is a monitoring switch.

14. The passenger car transport as claimed in claim 9, further comprising:
    at least one wheel speed sensor connected to the electronic monitoring system to sense a velocity of the passenger car transport, wherein the monitoring electronics are adapted to generate a warning when the velocity is indicative of a driving state.

* * * * *